US008615638B2

(12) United States Patent
Shirlen et al.

(10) Patent No.: US 8,615,638 B2
(45) Date of Patent: Dec. 24, 2013

(54) MEMORY CONTROLLERS, SYSTEMS AND METHODS FOR APPLYING PAGE MANAGEMENT POLICIES BASED ON STREAM TRANSACTION INFORMATION

(75) Inventors: Martyn Ryan Shirlen, Wake Forest, NC (US); Richard Gerard Hofmann, Cary, NC (US); Mark Michael Schaffer, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 12/900,857

(22) Filed: Oct. 8, 2010

(65) Prior Publication Data

US 2012/0089789 A1 Apr. 12, 2012

(51) Int. Cl.
*G06F 12/00* (2006.01)
*G06F 13/00* (2006.01)

(52) U.S. Cl.
USPC ..... 711/154; 711/100; 711/111; 711/E12.001

(58) Field of Classification Search
USPC .......................... 711/100, 154, 111, E12.001
See application file for complete search history.

(56) References Cited

U.S. PATENT DOCUMENTS

| | | | | |
|---|---|---|---|---|
| 6,381,672 | B1 | 4/2002 | Strongin et al. | |
| 6,510,497 | B1 | 1/2003 | Strongin et al. | |
| 6,546,439 | B1 | 4/2003 | Strongin et al. | |
| 6,647,456 | B1 | 11/2003 | Van Dyke et al. | |
| 7,363,406 | B2 | 4/2008 | Chai et al. | |
| 7,424,579 | B2 | 9/2008 | Wheeler et al. | |
| 2005/0044174 | A1 * | 2/2005 | Landin et al. | 709/217 |
| 2006/0136639 | A1 | 6/2006 | Futral et al. | |
| 2008/0183977 | A1 | 7/2008 | Gower et al. | |
| 2010/0088443 | A1 | 4/2010 | Riocreux et al. | |
| 2012/0089759 | A1 | 4/2012 | Shirlen et al. | |

FOREIGN PATENT DOCUMENTS

WO WO2005099108 A1 10/2005

OTHER PUBLICATIONS

International Search Report and Written Opinion—PCT/US2011/055637—ISA/EPO—Feb. 3, 2012.

* cited by examiner

*Primary Examiner* — Midys Rojas

(74) *Attorney, Agent, or Firm* — Nicholas J. Pauley; Peter Michael Kamarchik; Joseph Agusta

(57) ABSTRACT

Memory controllers, systems, methods, and computer-readable mediums for applying a page management policy(ies) based on stream transaction information are disclosed. In one embodiment, a memory controller is provided and configured to receive memory access requests for stream transactions. The memory controller is configured to perform a memory access to a memory page(s) in memory included in the stream transaction. The controller is further configured to apply a page management policy(ies) to the memory page(s) in memory based on information related to the stream transactions. In this manner, the page management policy(ies) can be configured to utilize page open policies for efficiency that stream transactions may facilitate, but while also recognizing and taking into consideration in the page management policy latency issues that can arise when the memory controller is handling memory access requests from different devices.

31 Claims, 10 Drawing Sheets

14(1) 14 10 28 32 31 33 COLUMN (38) 34 PAGE/ ROW (36) CLK 30(0) 24 ADDR/CTRL MEMORY CONTROLLER 26 CS(0) $DDR_0$ 29 DATA B3 B2 B0 B1 30(N) $DDR_N$ CS(N) 14(N) 14 SLAVE DEVICES 14(0) SLAVE DEVICE CTRL_ BLOCK SLAVE DEVICE 16 22 20 ARBITER BUS INTERCONNECT 12 MASTER DEVICES 12(1) CPU 12(2) DSP 12(3) FPGA 12(4) DMA CONTROLLER 12(5) DISPLAY PROCESSOR 18 DISPLAY

MEMORY CONTROLLERS, SYSTEMS AND METHODS FOR APPLYING PAGE MANAGEMENT POLICIES BASED ON STREAM TRANSACTION INFORMATION

RELATED APPLICATION

The present application is related to co-pending U.S. patent application Ser. No. 12/900,800, Customer Number 23696, filed on Oct. 8, 2010, entitled "ARBITRATING BUS COMMUNICATIONS BASED ON INFORMATION RELATED TO A STREAM TRANSACTION(S)," and incorporated herein by reference in its entirety.

BACKGROUND

I. Field of the Disclosure

The technology of the disclosure relates generally to memory access controllers and memory page management policies in a processor-based system.

II. Background

It is common for processor-based systems, including central processing unit (CPU) based systems, to use dynamic memory for system memory. Dynamic memory is also commonly referred to a "dynamic random access memory" or "DRAM." Dynamic memory is typically organized into a number of memory banks with each memory bank containing multiple memory pages. Accessing dynamic memory involves two discrete tasks, both of which may consume processing time. First, the memory page (i.e., row) corresponding to the desired memory location in the memory bank to be accessed is opened. This is also known as a "row select," referring to a two-dimensional row and column memory arrangement. Second, the desired memory location within the memory page (i.e., column) is accessed. This is also known as a "column select." The memory page containing the accessed memory location must be closed before another memory page can be opened in the same memory bank. This can lead to increased memory access times which can impact CPU performance in terms of both reduced bandwidth and increased latency (i.e., processing time) in transactions involving memory accesses.

To reduce memory access times and latency, memory controllers can be configured with a global memory page management policy to leave open a memory page after a memory access. The leave open memory page management policy only closes the memory page if required to service a pending memory access request targeting a new memory page or to perform memory maintenance commands, such as auto-refresh or self-refresh, as examples. Configuring a memory controller to leave open a memory page after an access may be advantageous for certain memory applications, particularly those involving non-random, sequential memory location accesses, such as by multi-media applications or processors, as an example. In these scenarios, sequential memory accesses are often to the same memory page. Processing time is saved by not closing the memory page for a memory bank prior to a next memory access to the same memory page in the memory bank. However, a tradeoff exists by providing a memory page management policy to leave open memory pages. A processing time penalty is incurred if sequential memory accesses to a memory bank are to different memory pages. If, for example, a memory controller receives a request to access a different memory page than a currently open memory page in a memory bank, the memory controller must close the currently open memory page before the new memory page can be opened. The additional processing time incurred in closing the currently open memory page before a new memory page can be accessed can increase latency. Another tradeoff of employing a memory page management policy of leaving open a memory page is the additional power expended to keep the memory page open after an access.

SUMMARY OF THE DISCLOSURE

Embodiments disclosed in the detailed description include memory controllers, systems, methods, and computer-readable mediums for applying a page management policy(ies) based on stream transaction information. In this regard in one embodiment, a memory controller is provided. The memory controller comprises a controller configured to receive memory access requests for stream transactions. A stream transaction is a superset of burst access types to facilitate efficient bulk transfers of data. The memory controller is also configured to receive memory access requests for non-stream transactions, such as single burst and single beat access types. The memory controller is configured to perform memory accesses to memory pages in memory specified by stream transactions. The controller is further configured to apply a page management policy(ies) to the memory based on information related to the stream transactions. As examples, stream transaction information can provide information on address ranges in memory that will be accessed in the future as well as the progress of pending stream transactions. In this manner, the page management policy(ies) can be configured for efficiency when utilizing stream transactions. The page management policy(ies) can also be provided that take into consideration latency issues that can arise when the memory controller is handling multiple memory access requests, including stream transactions, from different devices.

As one non-limiting example, the page management policy may be based on whether a current memory page for a stream transaction is the next memory page to be accessed by a pending stream transaction. If so, the page management policy applied may be to leave open the current memory page after the memory access for the current stream transaction to avoid processing time in closing and re-opening the current memory page. If not, the page management policy applied may be to close the current memory page after the memory access for the current stream transaction. As another non-limiting example, the page management policy may be based on whether a next memory page for a current stream transaction is not the current memory page accessed for the stream transaction (i.e., a page or row crossing). If not, the page management policy applied may be to close the current memory page after the memory access for the current stream transaction. In another non-limiting example, the page management policy may be based on whether there are a plurality of memory access requests for stream transactions to a same memory bank in memory. If so, the page management policy may be to leave open or close a memory page for a current stream transaction depending on stream transaction attributes, including without limitation, whether all stream transactions are deadlined, whether only one stream transaction is deadlined, and/or whether the stream transactions are behind their deadlines.

In another embodiment, a method for accessing memory is provided. The method comprises receiving a memory access request for a stream transaction at a memory controller. The method also comprises performing a memory access to at least one memory page in memory included in the stream transaction. The method also comprises determining a page management policy for the at least one memory page based on information related to the stream transaction. The method also comprises applying the page management policy to the at least one memory page.

In another embodiment, a computer-readable medium is provided having stored thereon computer-executable instructions to cause a memory controller to receive a memory access request for a stream transaction. The computer-readable medium also has stored thereon computer-executable instructions to cause the memory controller perform a memory access to at least one memory page in memory included in the stream transaction. The computer-readable medium also has stored thereon computer-executable instructions to cause the memory controller to apply a page management policy to the at least one memory page based on information related to the stream transaction.

DETAILED DESCRIPTION

Figure 1:
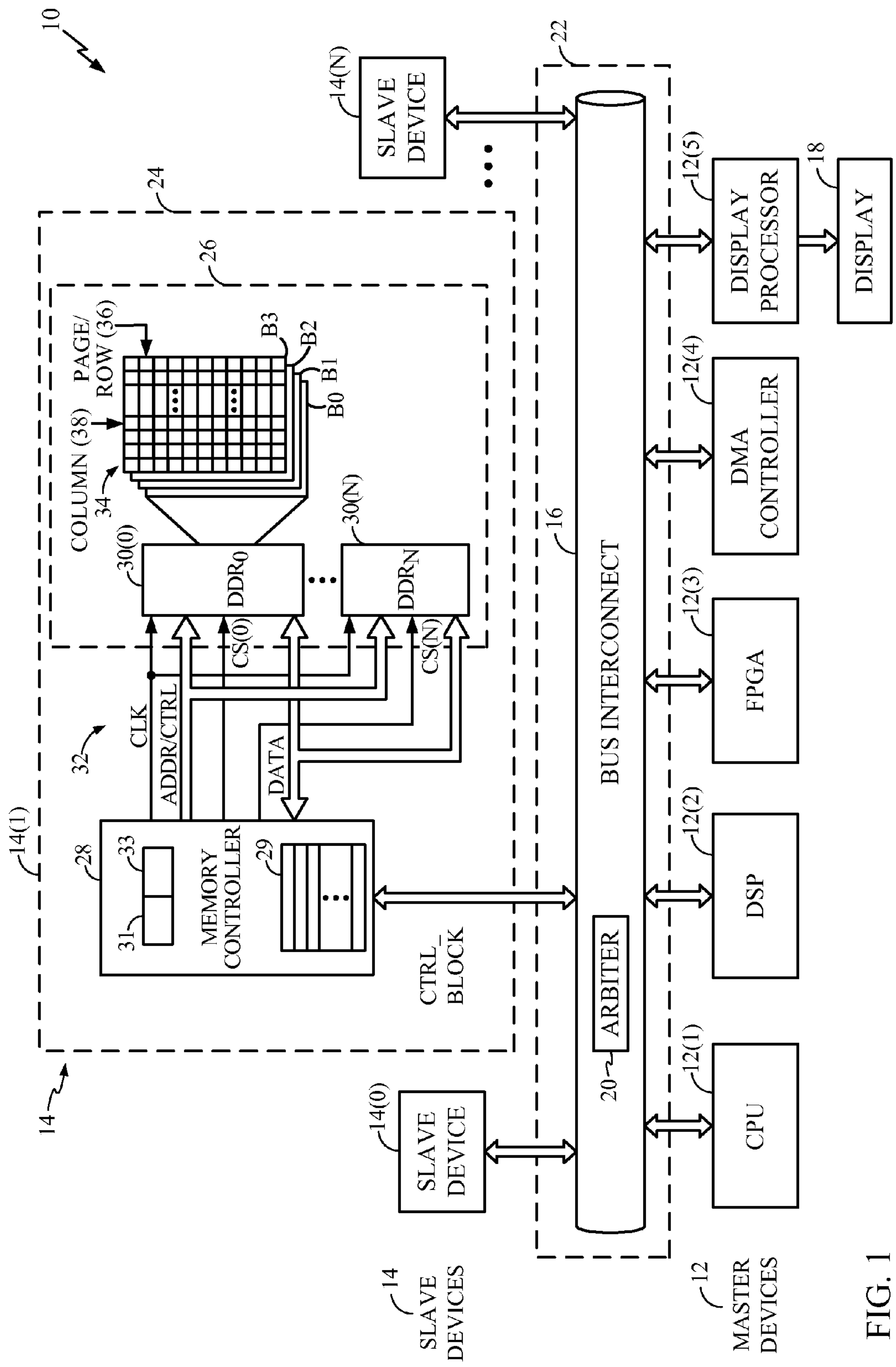
FIG. 1 is a block diagram of an exemplary system that includes a bus interconnect connecting a plurality of master devices to slave devices, one of which is a memory system comprised of a memory controller configured to support stream transactions and apply a page management policy(ies) to memory based on information related to stream transactions.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include memory controllers, systems, methods, and computer-readable mediums for applying a page management policy(ies) based on stream transaction information. In this regard in one embodiment, a memory controller is provided. The memory controller comprises a controller configured to receive memory access requests for stream transactions. A stream transaction is a superset of burst access types to facilitate efficient bulk transfers of data. The memory controller is also configured to receive memory access requests for non-stream transactions, such as single burst and single beat access types. The memory controller is configured to perform memory accesses to memory pages in memory specified by stream transactions. The controller is further configured to apply a page management policy(ies) to the memory based on information related to the stream transactions. As examples, stream transaction information can provide information on address ranges in memory that will be accessed in the future as well as the progress of pending stream transactions. In this manner, the page management policy(ies) can be configured for efficiency when utilizing stream transactions. The page management policy(ies) can also be provided that take into consideration latency issues that can arise when the memory controller is handling multiple memory access requests, including stream transactions, from different devices.

Figure 2:
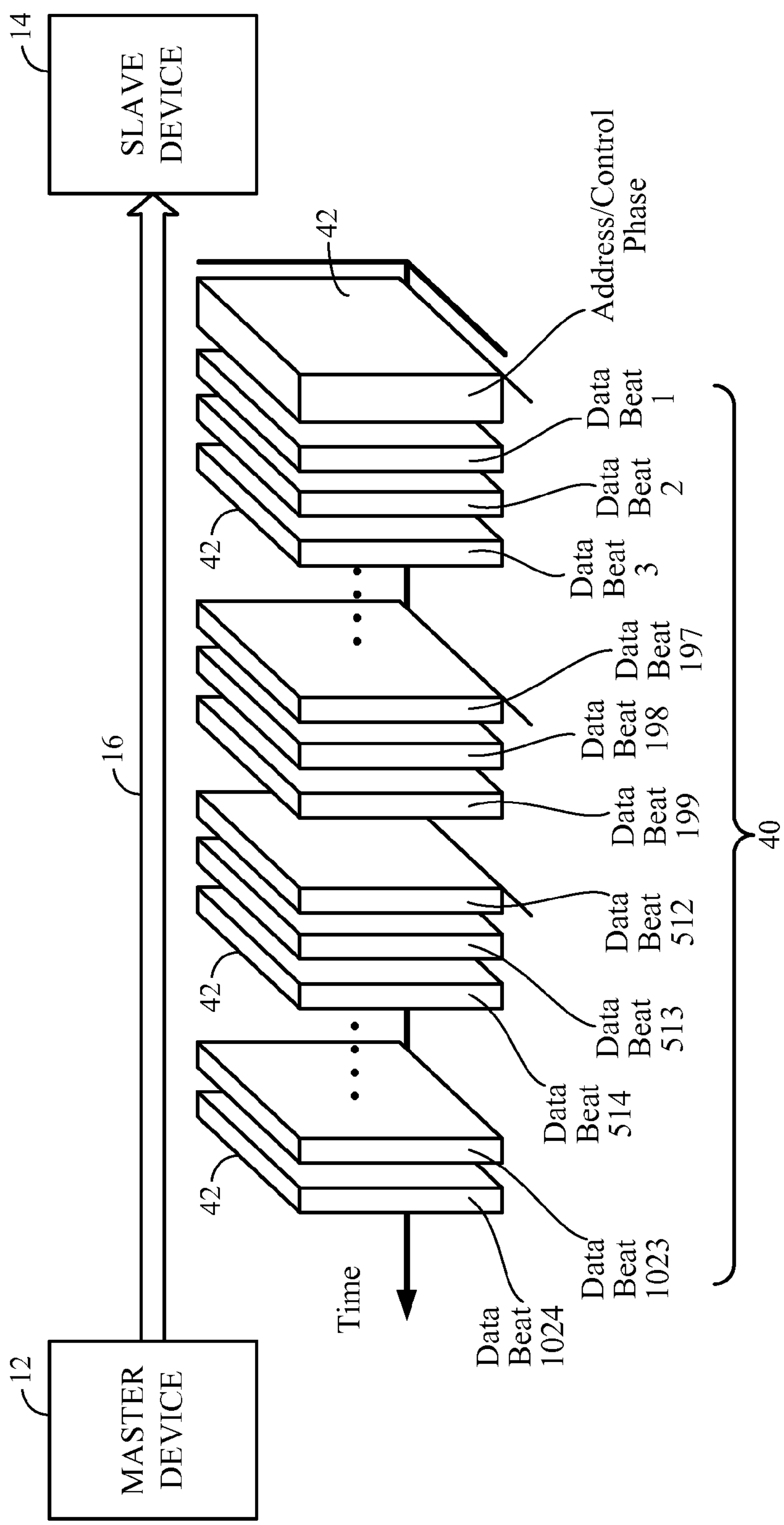
FIG. 2 is a block diagram of an exemplary stream transaction response from a slave device to a master device in response to a memory access request for a stream transaction by the master device to the slave device.

FIGS. 1 and 2 illustrate an exemplary system that includes a memory controller for performing memory access requests, including memory access requests for stream transactions. In this regard, FIG. 1 illustrates an exemplary system 10 that includes a memory controller for applying a page management policy(ies) to memory based on stream transaction information. The system 10 includes a plurality of master devices 12 interconnected to slave devices 14 via a bus interconnect 16. The bus interconnect 16 is configurable to allow one or more of the master devices 12 connected to the bus interconnect 16 to communicate with any of the slave devices 14, which are also each connected to the bus interconnect 16. An arbiter 20 is provided in the bus interconnect 16 in this embodiment to arbitrate multiple communication requests from the master devices 12 to the slave devices 14 since the slave devices 14 are shared resources to the master devices 12. As an example, the bus interconnect 16 may be provided in a semiconductor die 22 and may be provided in a system-on-a-chip (SOC) integrated circuit design, if desired.

The master devices 12 and the slave devices 14 can be any type of electronic device or subsystem desired, and thus may include without limitation a central processing unit (CPU) 12(1), digital signal processor (DSP) 12(2), a field-programmable gate array (FPGA) 12(3), direct memory access (DMA) controller 12(4), and a display processor 12(5) that controls information provided to a display 18, as illustrated in FIG. 1. An example of a slave device 14 is a memory system 24, which is illustrated in FIG. 1. The memory system 24 is connected to the bus interconnect 16 to allow any of the master devices 12 to provide read and write memory access requests to memory 26 in the memory system 24 and to receive read and write responses. In this regard, the memory system 24 includes a memory controller 28 that interfaces the bus interconnect 16 to the memory 26 and controls the flow of data to and from memory 26 in response to memory access requests provided by master devices 12 through the bus interconnect 16 to the memory system 24.

Memory access information provided in the form of a control block (CTRL_BLOCK), as will be discussed in more detail below, is provided to the memory controller 28 to request a memory access transaction to memory 26. The memory controller 28 includes a memory access request queue 29 to buffer memory access requests from the master devices 12. A controller 31 may also be provided in the memory controller 28 to control operations by the memory controller 28 including receiving and performing memory access requests, and determining and applying page management policies to memory 26. The controller 31 may include circuits without the employment of software instructions. The memory controller 28 may also include a processor(s) that executes software instructions provided in a computer-readable medium 33 in the controller 31 or otherwise accessible to the memory controller 28. The computer-readable medium 33 may be comprised of registers and/or other memory as examples.

A memory bus 32 is provided to interface the memory 26 to the memory controller 28 that includes chip selects CS(0)-CS(N), one for each memory unit 30(0)-30(N) provided. Each memory unit 30(0)-30(N) may be a separate memory chip. The chip selects CS(0)-CS(N) are selectively enabled by the memory controller 28 to enable the memory units 30(0)-30(N) containing the desired memory location to be accessed. The memory controller 28 enables one of the memory units 30(0)-30(N) at a time in this example so that one of the memory units 30(0)-30(N) asserts data on a data bus (DATA) at one time to avoid data collisions. The memory bus 32 also includes an address/control bus (ADDR/CTRL) that allows the memory controller 28 to control the memory address accessed in the memory units 30(0)-30(N) for either writing to or reading from memory 26. The memory bus 32 also includes a clock signal (CLK) to synchronize timing between the memory controller 32 and the memory units 30(0)-30(N) for memory accesses.

With continuing reference to FIG. 1, each memory unit 30(0)-30(N) contains a plurality of memory banks, referred to generally as element 34. FIG. 1 illustrates the memory banks 34 for one of the memory units 30(0). A memory bank is a logical unit of memory. In the illustrated example of FIG. 1, the memory banks 34 provide sixteen (16) bits of information at one time on the DATA bus. In the illustrated example, each memory unit 30(0)-30(N) contains four memory banks Only the four memory banks (B0, B1, B2, and B3) are illustrated in FIG. 1; however, any number of memory banks desired may be provided in each memory unit 30(0)-30(N). Each memory bank (B0-B3) is organized into a grid-like pattern, with "rows" and "columns." Each row is known as a memory page 36. In order to access a memory location in memory 26, the memory controller 28 asserts a chip select CS(0)-CS(N), and issues a memory page open command that activates a certain memory page 36 as indicated by the address on the ADDR/CTRL bus. This command typically takes a few clock cycles. After the desired memory page 36 is opened, a column address 38, along with either a "read" or "write" command, is issued by the memory controller 28 to access the data in the desired memory location. When an access is requested to another memory page 36 in the memory banks 34, the memory controller 28 has to deactivate or close the currently activated memory page 36, which typically takes a few clock cycles.

If sequential or a series of memory accesses are made to the same memory page 36 in a given one of the memory banks 34, clock cycles could be saved if the memory page 36 is left open after the access. In this manner, subsequent memory accesses to the same memory page 36 would not require reopening the memory page 36. The amount of total clock cycle savings depends on the number of sequential or series of memory accesses to the same memory page 36. However, if memory accesses are often made to different memory pages 36, keeping or leaving open a memory page 36 after an access can result in clock cycle penalties. The amount of clock cycle penalty can depend on the number of subsequent memory accesses to different memory pages 36. The amount of clock cycle penalty can also depend on the specific timing parameters of memory 26 that govern how long the memory controller 28 must wait in response to a memory access request.

In this embodiment, the memory units 30(0)-30(N) are dynamic memories. Each memory unit 30(0)-30(N) is a sixteen (16)-bit double data rate (DDR) dynamic random access memory (DRAM) chip, labeled $DDR_0$ and $DDR_N$. In this regard, the memory controller 28 that controls accesses to the memory units 30(0)-30(N) may be a DDR memory controller. The memory units 30(0)-30(N) may be any type of dynamic memory. Examples include synchronous DRAM (SDRAM), double data rate (DDR) SDRAM, DDR2 DRAM, DDR3 DRAM, mobile DDR (MDDR) DRAM, low power DDR (LPDDR) DRAM and LPDDR2 DRAM. The memory units 30(0)-30(N) may be other types of memory other than dynamic memory. The memory controller 28 may be any type of memory controller compatible with the memory units 30(0)-30(N). Further, the memory controller 28 or memory system 24 may be provided on a motherboard or other printed circuit board (PCB) as a separate device, or may be integrated into the same semiconductor die 22 that includes the bus interconnect 16, which may reduce latency. Further, the master devices 12 may be integrated into the same semiconductor die 22 that includes the bus interconnect 16 as well.

The master devices 12 in FIG. 1 may provide single beat or burst transactions to the bus interconnect 16 to be serviced by the memory system 24 connected to the bus interconnect 16. The master devices 12 in FIG. 1 may also provide stream transactions to the bus interconnect 16 to be serviced by the memory system 24. Stream transactions may be used to move large amounts of data efficiently. A stream transaction to the memory system 24 may consist of a superset of bursts to provide for larger amounts of data to be transferred as part of a single transaction request. An example of a stream transaction is illustrated in FIG. 2. In this example in FIG. 2, there are two hundred fifty-six (256) bursts of data, where each burst is comprised of four (4) data beats. The slave device 14 provides a stream of data 40 comprised of a superset of burst data transactions 42 on the bus interconnect 16 in response to a stream transaction previously requested by the master device 12 to the slave device 14. For example, the master device 12 in this example may be a DMA controller configured to receive and transfer large amounts of data from memory 26 to other devices coupled to the DMA controller.

Because stream transactions provide finite information about future memory access and related data transfer traffic on the bus interconnect 16, it may be advantageous in terms of clock cycle efficiencies to use information relating to the stream transactions to determine the page management policy applied by the memory controller 28. For example, if a currently accessed memory page for a stream transaction is the next memory page to be accessed by another pending stream transaction, it may be more efficient to apply a page management policy to leave open the current memory page after the memory access. As another example, if a page (or row) crossing will occur next during the processing of a stream transaction, it may be more efficient to apply a page management policy to close the current memory page after the last access in the current memory page. If a plurality of stream transactions are active with accesses to the same memory bank, it may be efficient to apply a page management policy to leave open or close a memory page for a current stream transaction depending on stream transaction attributes, including without limitation, whether all stream transactions are deadlined, whether only one stream transaction is deadlined, and/or whether the stream transactions are behind their deadlines.

Figure 3:
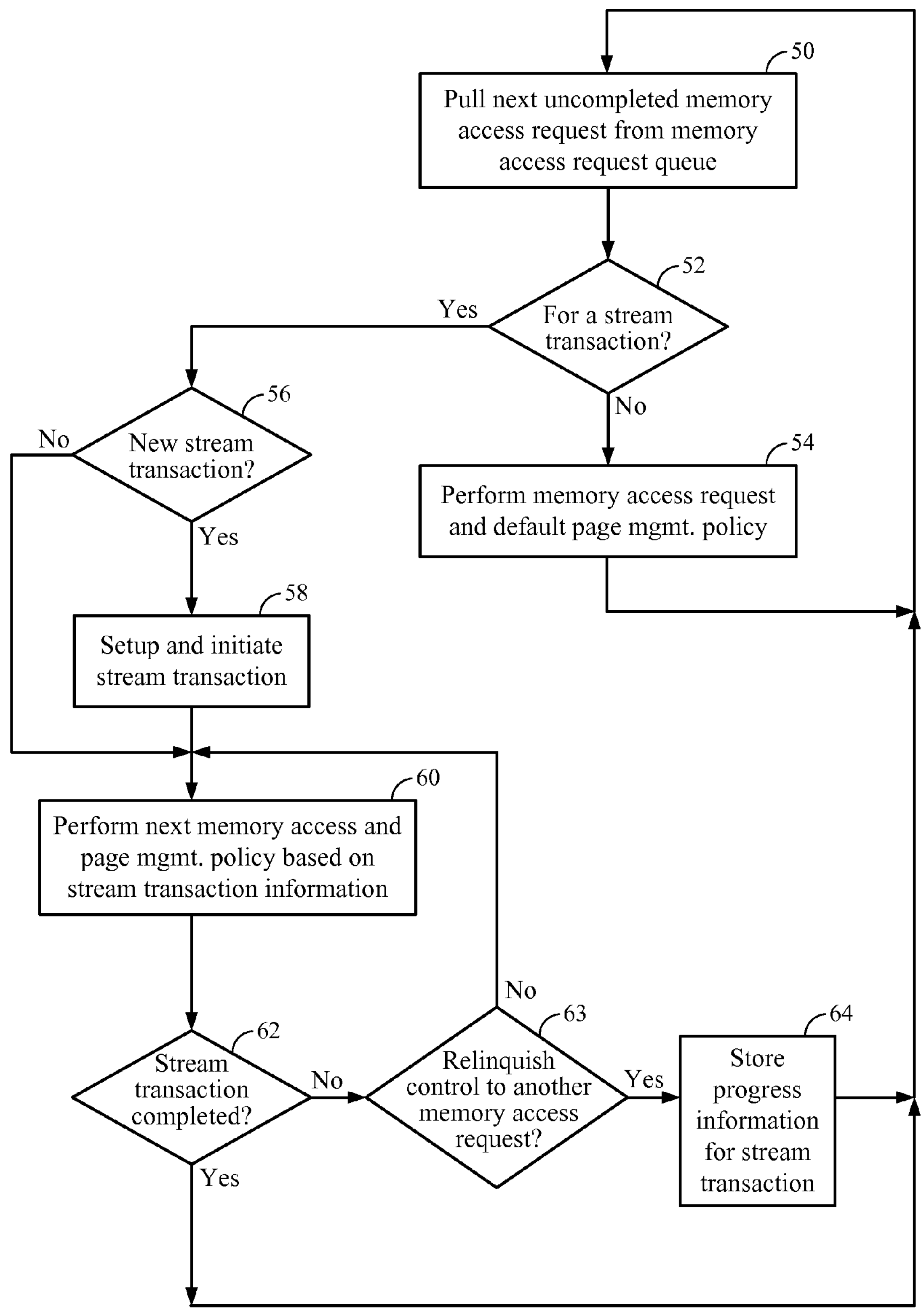
FIG. 3 is a flowchart illustrating an exemplary process performed by the memory controller of FIG. 1 to process memory access requests and apply a page management policy (ies) to memory based on information related to stream transactions.

In this regard, FIG. 3 is a flowchart illustrating an overall exemplary process performed by the memory controller 28 of FIG. 1 to process memory access requests that can include stream transactions. For stream transactions, the memory controller 28 is configured to determine and apply a page management policy(ies) to memory based on information related to the stream transactions. With reference to FIG. 3, the memory controller 28 pulls the next uncompleted memory access request from the memory access request queue 29 (block 50). The memory controller 28 determines if the pulled memory access request is for a stream transaction (block 52). If not, the memory controller 28 may perform the memory access to memory 26 and apply a default page management policy that is not based on stream transaction information (block 54). However, if the memory access request is for a stream transaction (block 52), the memory controller 28 may determine if the stream transaction is new or currently in-process (block 56). If not already in-process, the memory controller 28 sets up and initiates the stream transaction (block 58). Thereafter, the memory controller 28 performs the next memory access in the stream transaction by accessing the memory page 36 in memory 26 containing the address of the memory access request (block 60). The memory controller 28 then applies a page management policy to the accessed memory page 36 based on information relating to the stream transaction (block 60).

If the stream transaction being processed is completed (block 62), the memory controller 28 pulls the next uncompleted memory access request from the memory access request queue 29 (block 50) and the process repeats. If the stream transaction is not completed (block 62), the memory controller 28 determines if the control of access to memory 26 should be given to another memory access in the memory access request queue 29 (block 63). For example, the memory controller 28 may be configured to switch to a next memory access request in the memory access request queue 29 before the current memory access request is completed. Switching out memory access requests for stream transactions before completion may be performed so that other memory access requests are not starved by the memory controller 28. Also, as another example, a stream transaction may be switched if other stream transactions in the memory access request queue 29 have a more intensive deadline and/or higher priority than the current stream transaction being processed.

If control is to be relinquished for the current stream transaction, the memory controller 28 stores progress information on the current stream transaction in the memory request access queue 29 so that the stream transaction can be continued at a later time (block 64). The memory controller 28 then pulls the next uncompleted memory access request from the memory access request queue 29 (block 50) and the process repeats. If control is not to be relinquished for the current stream transaction being processed (block 63), the memory controller 28 performs the next memory access in the stream transaction by accessing the memory page 36 in memory 26 containing the address of the memory access request (block 60). The memory controller 28 then applies a page management policy to the accessed memory page 36 based on information relating to the stream transaction (block 60).

Figure 4A:
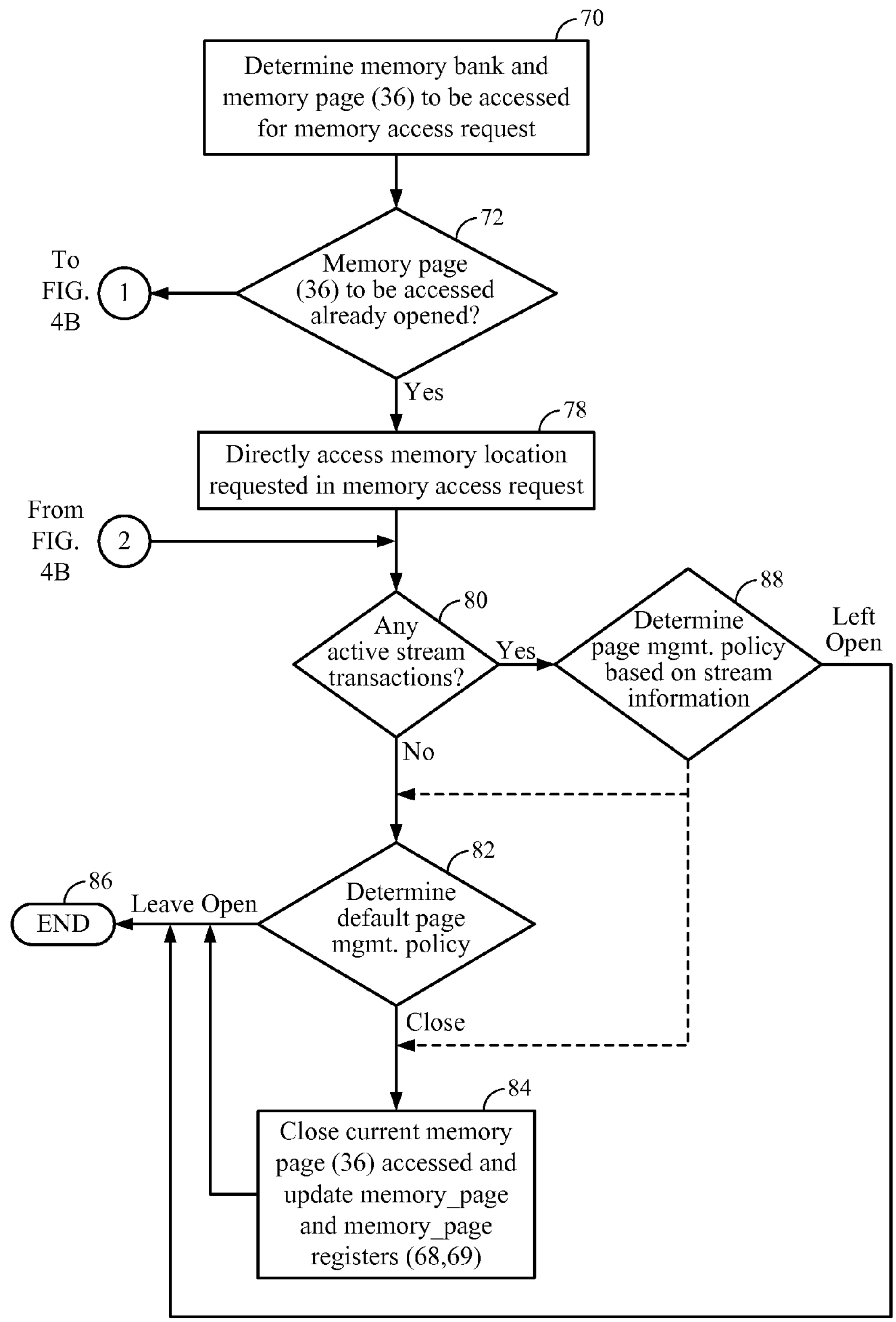
FIGS. 4A and 4B are flowcharts illustrating an exemplary process of a memory controller applying a page management policy based on information related to stream transactions.
Figure 4B:
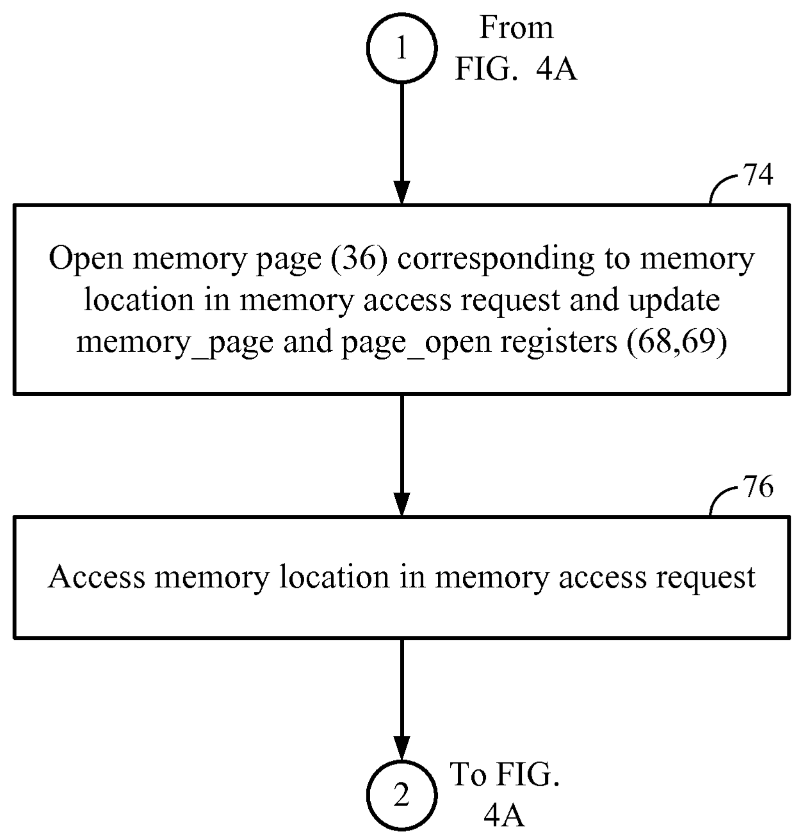

FIGS. 4A and 4B are flowcharts illustrating an exemplary process of a memory controller applying a page management policy based on information related to stream transactions. The process illustrated in FIGS. 4A and 4B may be performed by the memory controller 28 in FIG. 1 as part of block 60 in FIG. 3, as an example. In this regard, FIGS. 4A and 4B will be discussed with regard to the system 10 and memory controller 28 in FIG. 1. However, the process in FIGS. 4A and 4B can be employed in any system desired where page management policies are provided and applied.

With reference to FIG. 4A, the memory controller 28 determines the memory bank 34 and memory page 36 to be accessed for a current memory access request (block 70 in FIG. 4A). As previously discussed above, the memory access requests processed by the memory controller 28 may be stored in the memory access request queue 29. The memory controller 28 then consults internal registers, such as an internal register 66 in FIG. 5 for example, to determine if the memory page 36 to be accessed is already opened (block 72 in FIG. 4A). In the example in FIG. 5, the internal registers 66 are provided for each memory bank 34 in memory 26. The internal registers 66 contain a memory bank register 68 to store the last accessed memory page (MEMORY_PAGE) 36 for a given memory bank 34 and whether the memory page 36 is currently open as indicated by a page open register (PAGE_OPEN) 69. If the memory page 36 to be accessed is not already open (block 72 in FIG. 4A), the memory controller 28 opens the memory page 36 corresponding to the memory access request (block 74 in FIG. 4B). The memory controller 28 thereafter accesses the memory location in the memory access request (block 76 in FIG. 4B). If, in block 72 in FIG. 4A, the memory page 36 to be accessed is already open as determined by the page open register 69 in FIG. 5, the memory controller 28 can directly access the memory location requested in the memory access request without having to open the memory page 36 containing to the memory address (block 78 in FIG. 4A).

After the memory location in the memory access is requested (either after block 78 in FIG. 4A or block 76 in FIG. 4B), the memory controller 28 then determines a page management policy to be applied to the open memory page 36 for the memory access request. Depending on the determined page management policy, the memory controller 28 may leave open the current memory page 36 or close the current memory page 36 after the memory access. The memory controller 28 in this embodiment can determine the page management policy based on information related to a stream transaction. In this regard, the memory controller 28 determines if there are any active stream transactions in the memory access request queue 29, including the current memory access request (block 80 in FIG. 4A). If not, the memory controller 28 determines a default page management policy irrespective of stream transactions (block 82 in FIG. 4A), and either closes the memory page 36 in the current memory access request (block 84 in FIG. 4A) or leaves open the memory page 36 in the current memory access request before the process ends (block 86 in FIG. 4A).

If there is an active stream transaction (block 80 in FIG. 4A), the memory controller 28 determines the page management policy for the memory page 36 currently open after the memory access based on stream transaction information (block 88 in FIG. 4A). As will be discussed in more detail below with regard to FIGS. 6-13, the page management policy based on stream transaction information can be provided by a memory controller in a variety of non-limiting manners. If the page management policy allows for closing the memory page 36 in the current memory access request (block 88 in FIG. 4A), the memory controller 28 closes the currently open memory page 36 before the process ends (block 86 in FIG. 4A), otherwise the currently open memory page 36 is left open before the process ends (block 86 in FIG. 4A).

Figure 5:
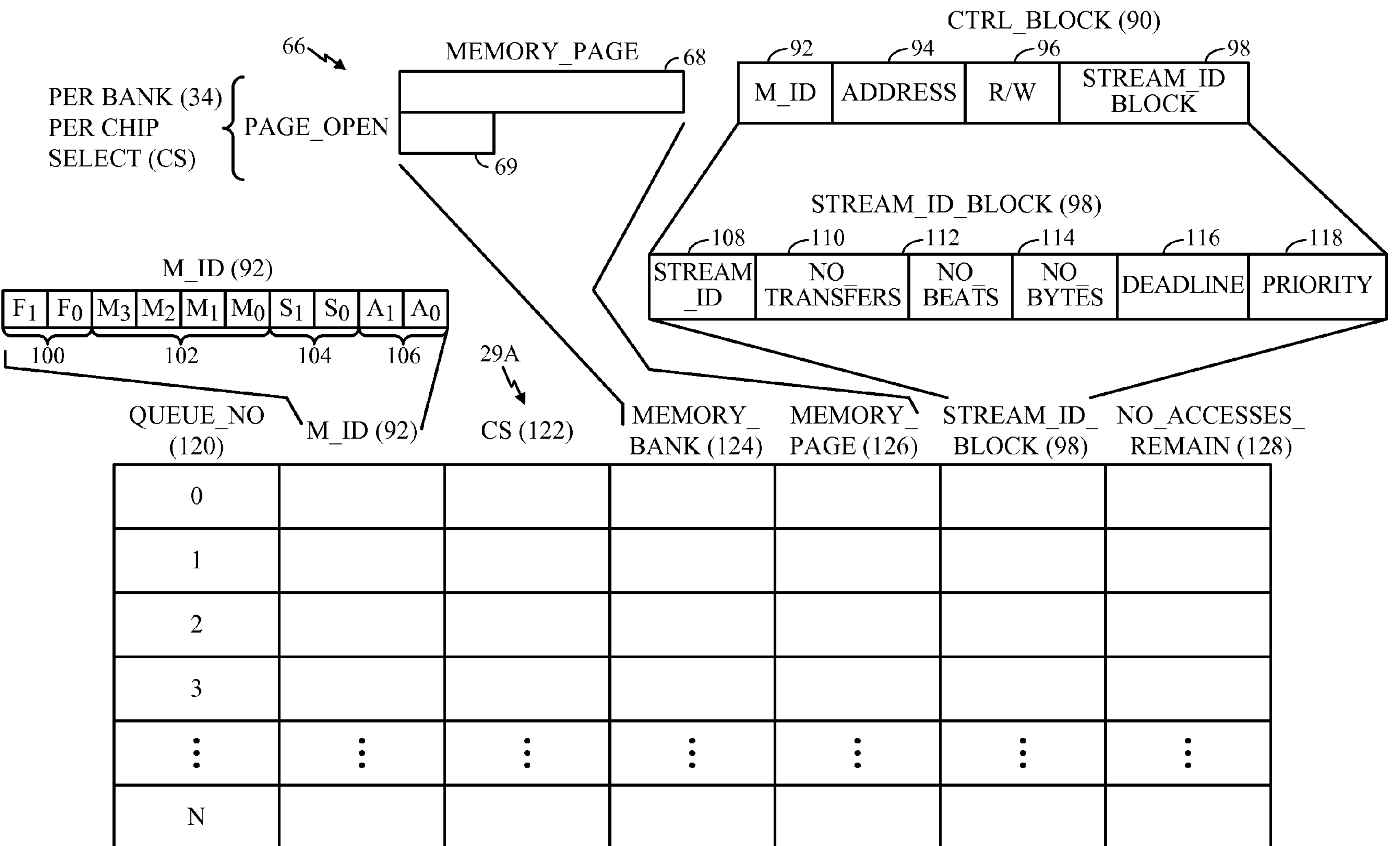
FIG. 5 is a diagram of an exemplary memory access request queue for a memory controller configured to support a master identification word, memory page information, and a stream identifier block from a control block provided by a master device requesting a bus transaction.

For a memory controller to support stream transaction requests, information regarding the stream transaction is provided to the memory controller. The stream transaction information provides information that, in essence, instructs the memory controller how to perform the stream transaction. For example, with regard to FIG. 1, the memory controller 28 receives information related to stream transactions over the bus interconnect 16 from master devices 12. As discussed herein, the memory controller 28 also uses this stream transaction information to determine a page management policy to be applied to memory after memory accesses. In this regard, FIG. 5 is a diagram of an exemplary memory access request queue 29A that may be used as the memory access request queue 29 in the memory controller 28 in FIG. 1 configured to support the stream transactions. The memory access request queue 29A may be provided in internal registers or other memory internal or external to and accessible by the memory controller 28. The memory access request queue 29A is comprised of a table configured to hold from zero (0) to N number of memory access requests.

FIG. 5 includes a diagram of an exemplary master identifier 92 that is provided in the memory access request queue 29A to identify the master device 14(0-M) requesting a bus transaction. In this example, the master identifier 92 is a 10-bit word. The upper two bits ($F_1$, $F_0$) contain a fabric identifier 100 that allows for identification of four (4) distinct fabrics involved in a particular memory access request. The middle four bits ($M_3$, $M_2$, $M_1$, $M_0$) are a master device identifier 102 that identifies the master device 12. Thus, sixteen (16) unique master devices 12 are possible in this example. The two bits ($S_1$, $S_0$) contain a sub-master device identifier 104 that identifies the sub-master device coupled to the master device 12 that is provided or applicable. Thus, four (4) unique sub-master devices are possible in this example. The lower two bits ($A_1$, $A_0$) contain an attribute identifier 106 that can be used to allow a master device 12 and/or a sub-master device to provide any attribute information desired. For example, the identification of a software process or thread could be provided in the attribute identifier 106 to allow a master device 12 and/or a sub-master device to identify the software process or thread responsible for a memory access request. Any other information desired could be included in the attribute identifier 106.

FIG. 5 also provides a diagram of an exemplary control block (CTRL_BLOCK) 90 for a bus protocol supported by the bus interconnect 16 of FIG. 1 that allows the master devices 12 to provide stream transaction information to the memory controller 28 for performing stream transactions. The control block 90 contains control information that allows the arbiter 20 and memory controller 28 to perform transaction requests from the master devices 12. For example, the control block 90 includes a master identifier (M_ID) 92 that contains an identifier associated with a requestor of a memory access request to the arbiter 20. The arbiter 20 uses the master identifier 92 to determine which master device 12 is to receive responses received from a slave device 14, including the memory controller 28. The address to be addressed for the memory access request is provided in an address (ADDRESS) field 94. Whether the memory access request is a read transaction or a write transaction is provided in a read/write (R/W) field 96. A stream identifier block (STREAM_ID_BLOCK) 98 is provided to provide stream transaction information for a bus transaction, which is a memory access request in this example.

FIG. 5 also includes a diagram of an exemplary stream identifier block that may be used as the stream identifier block 98 in the control block 90 in FIG. 5 and is provided in the memory access request queue 29A. The stream identifier block 98 contains exemplary information related to a stream transaction that provides information to allow a memory controller, including the memory controller 28 in FIG. 1, to perform a stream transaction associated for the stream identifier block 98. The stream identifier block 98 also contains exemplary information related to a stream transaction that may be used by a memory controller, including the memory controller 28 in FIG. 1, to determine a page management policy to be applied to memory after memory accesses. A master device 12 provides the information in the stream identifier block 98 when requesting a stream transaction on the interconnect bus 16.

As illustrated in FIG. 5, the stream block identifier 98 includes a stream identifier field (STREAM_ID) 108 that identifies the stream transaction. A number of transfers field (NO_TRANSFERS) 110 provides the number of burst transfers associated with a stream transaction. The number of beats field (NO_BEATS) 112 provides the number of beats of data transfer to be performed for each burst transfer. The number of bytes field 114 (NO_BYTES) provides the number of bytes of data to be transferred during each beat transfer. The number of bytes field 114 may be configurable or a fixed value depending on the architecture of the bus interconnect 16 and the slave devices 14. If there is a deadline associated with a stream transaction, deadline information can be stored in a deadline field (DEADLINE) 116. For example, a master device 12 may request that a particular stream transaction be completed within a certain timing, which could be in terms of clock cycles, beats, or other relative or absolute timing. A priority field (PRIORITY) 118 is also provided to allow a priority to be associated with a stream transaction. The priority field 118 may be configured to be supplied and/or altered by the master device 12, the arbiter 20, or the slave device 14 depending on design. Any of this stream information may be used by the memory controller 28 to determine a page management policy.

The memory controller 28 in FIG. 1 receives the memory access requests that include the control block 90 in FIG. 5 in this example from the arbiter 20, and stores the memory access requests in the memory access request queue 29A. A queue number field (QUEUE_NO) 120 is used to index the memory access requests stored in the memory access request queue 29A. Each memory access request entry in the memory access request queue 29A in this example includes the master identifier field 92 to identify the master device 12 that originated the memory access requests. The memory access request entries also include a chip select field (CS) 122, a memory bank field (MEMORY_BANK) 124, and a memory page field (MEMORY_PAGE) 126 determined by the memory controller 28 based on the address in the address field 94 in the received control block 90. The stream identifier block 98 is also provided for each memory access request entry to store stream transaction information if the memory access request is a stream transaction. A number of transfers remaining field (NO_ACCESSES_REMAIN) 128 is also provided to allow the memory controller 28 to store the progress of memory access requests for a stream transaction as the stream transaction is performed by the memory controller 28.

Figure 6:
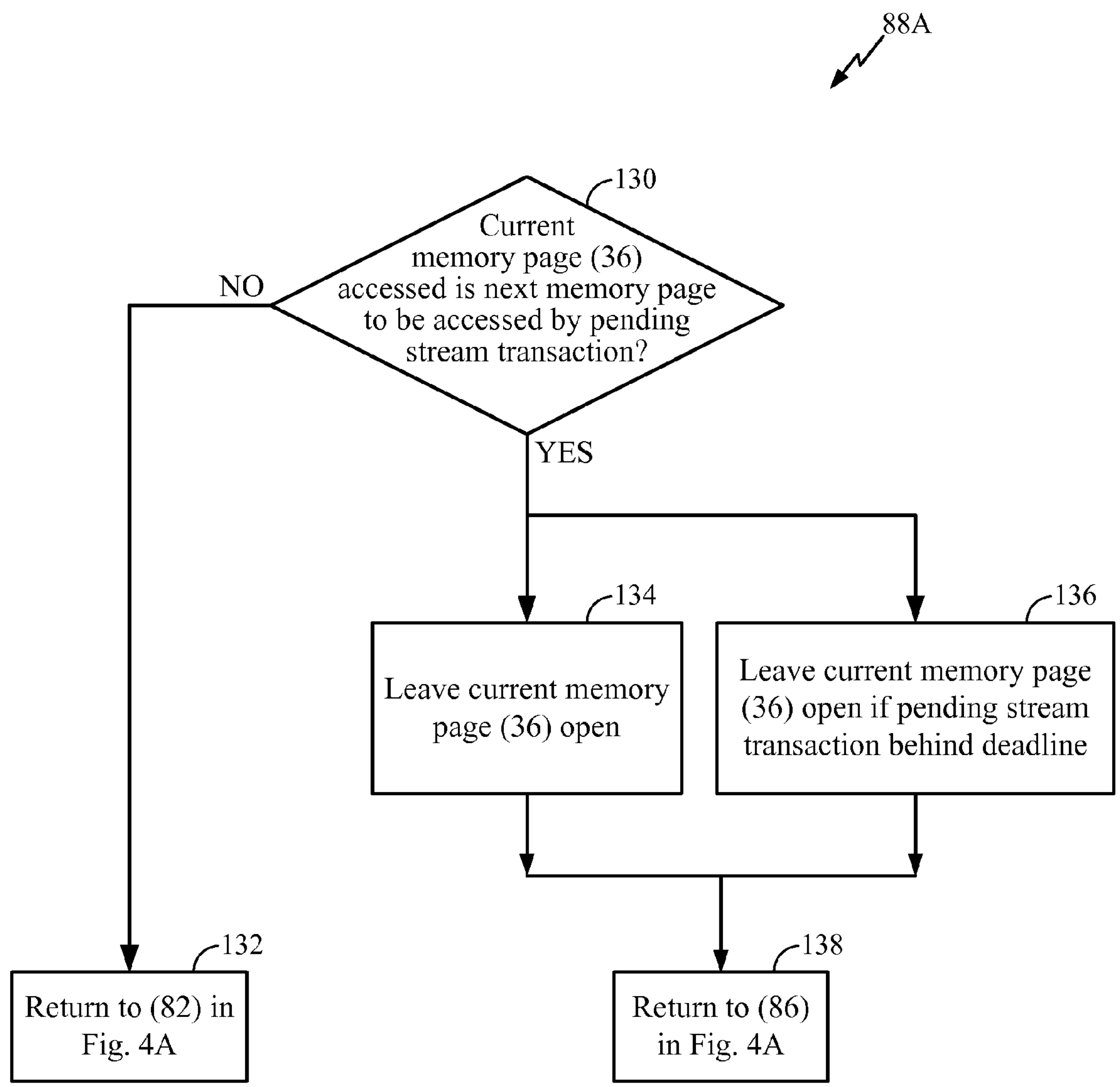
FIG. 6 is a flowchart of an exemplary process of a memory controller applying a page management policy to memory based on whether a current memory page being accessed is the next memory page to be accessed by a pending stream transaction.

Different criterion or criteria can be used by a memory controller, including the memory controller 28 of FIG. 1, to determine a page management policy based on information related to a stream transaction. This disclosure is not limited to any particular criteria or criterion. FIG. 6 is a flowchart of one exemplary criterion and process 88A of applying a page management policy based on whether a current memory page being accessed is the next memory page to be accessed by a pending stream transaction. The process may be performed as part of block 88 in FIG. 4A. As illustrated in FIG. 6, after a memory access by the memory controller 28, the memory controller 28 determines if the current memory page 36 accessed is the next memory page to be accessed by a stream transaction pending in the memory request access queue 29A (block 130). The pending stream transaction can be a subsequent portion of the current stream transaction being processed or another stream transaction in the memory request access queue 29A. If not, the memory controller 28 can apply a default page management policy after the memory access (block 132), which may be to either close the current memory page 36 after access or to leave open the current memory page 36 after access.

With continuing reference to FIG. 6, if the memory controller 28 determines that the current memory page 36 accessed is the next memory page to be accessed by a stream transaction pending in the memory request access queue 29A (block 130), it may be desirable to leave open the current memory page 36. In this scenario, it is known that at least one stream transaction will be requesting memory access to the current memory page 36 open. In this instance, the memory controller 28 may leave the current memory page 36 open (block 134). Alternatively, the memory controller 28 may leave the current memory page 36 open if only the pending stream transaction is behind its deadline (block 136), as provided in the deadline field 116 in the stream identifier block 98 in the memory access request queue 29A (FIG. 5); otherwise, the memory controller 28 could close the current memory page 36. Thereafter, the current memory access request ends (block 138).

Figure 7:
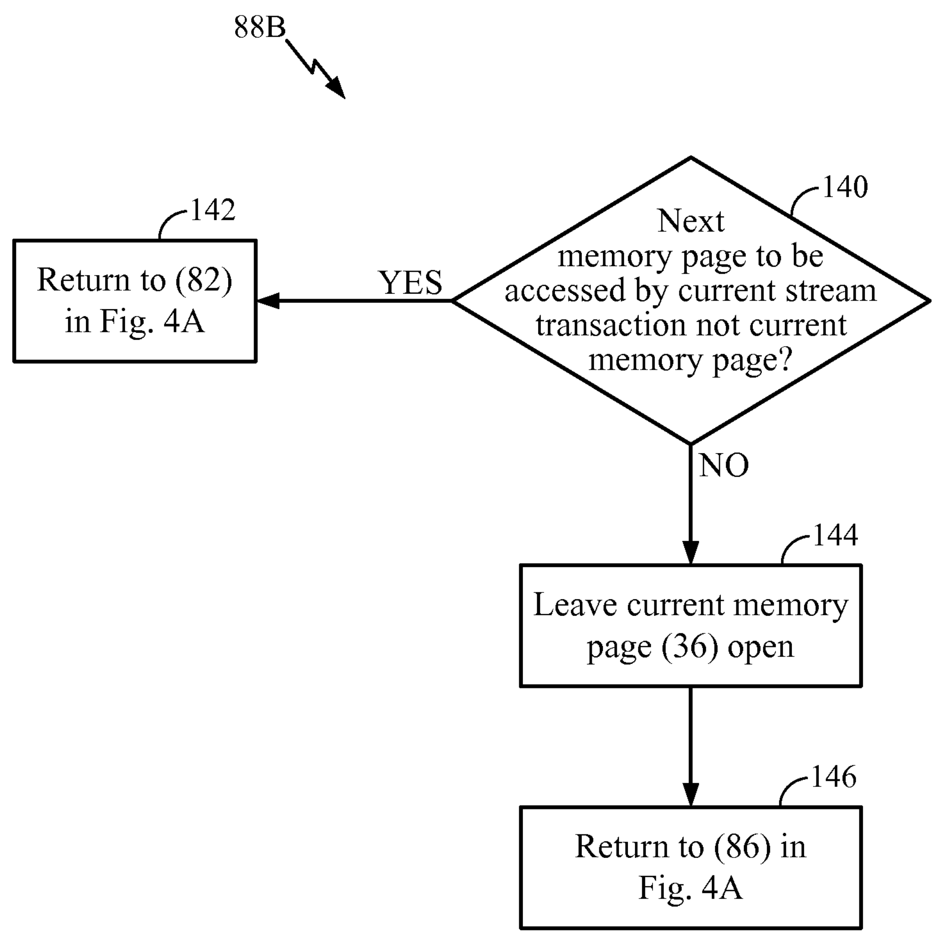
FIG. 7 is a flowchart of an exemplary process of a memory controller applying a page management policy to memory based on whether a next memory page to be accessed for a current stream transaction is not the current memory page being accessed by the current stream transaction.

FIG. 7 is a flowchart of another exemplary criterion and process 88B of a memory controller applying a page management policy. In this example, a memory controller applies a page management policy based on whether a next memory page to be accessed by a current stream transaction is not the current memory page being accessed by the current stream transaction. This means that a "page crossing" or "row crossing" will occur in the current memory page 36, and thus it may be advantageous to close the current memory page 36 after access prior to the next memory page access. This process may be performed as part of block 88 in FIG. 4A. As illustrated in FIG. 7, after a memory access by the memory controller 28, the memory controller 28 determines if the next memory page to be accessed by a current stream transaction being processed is not the current memory page 36 (block 140). If so, the default page management policy can be applied by the memory controller 28 (block 142), which may be to close the current memory page 36 after access. If not, this means a "row crossing" will not occur for the next memory access for the stream transaction. In this instance, the memory controller 28 may leave the current memory page 36 open after access (block 144) before the current memory access request ends (block 146).

Figure 8:
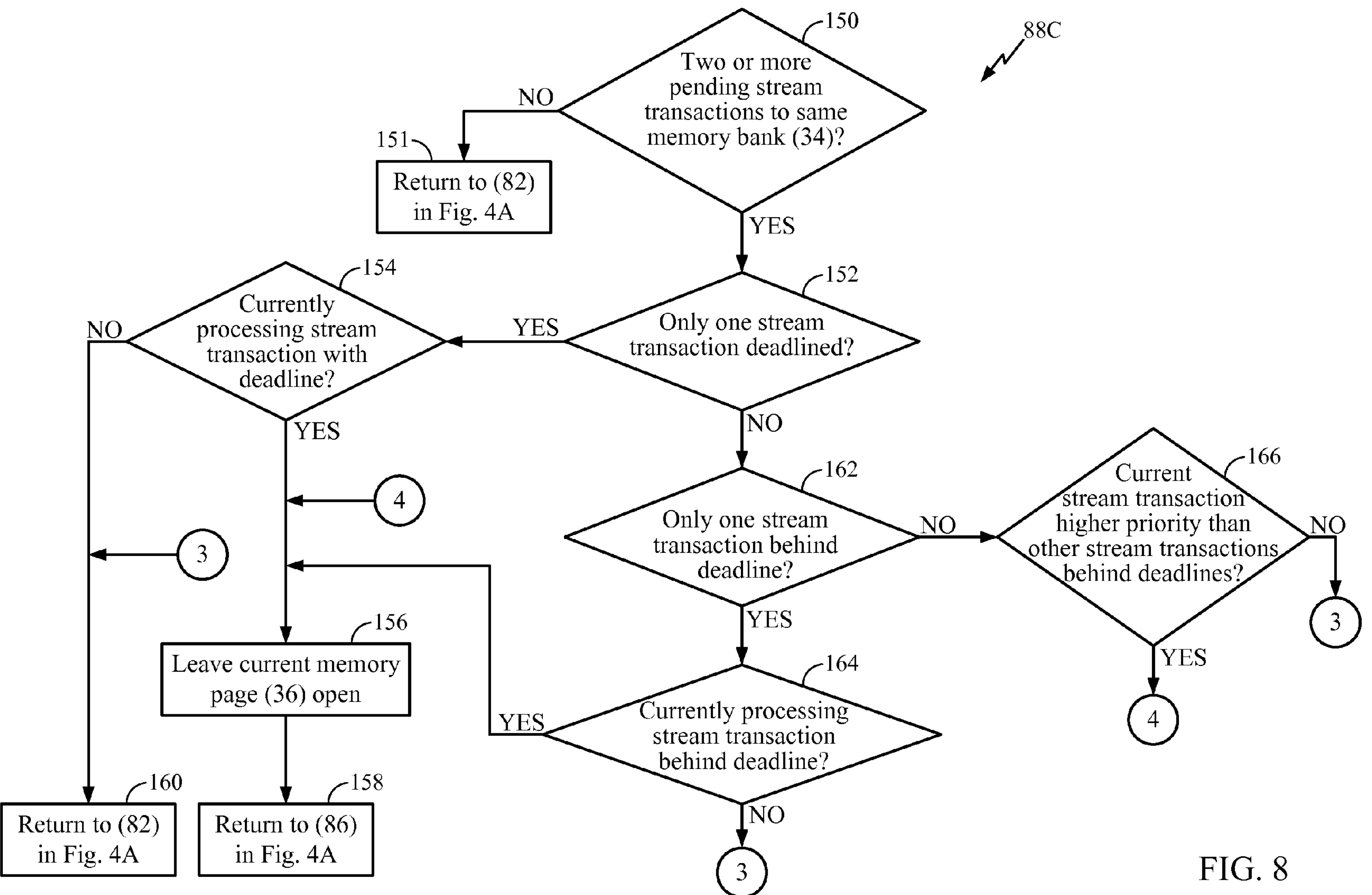
FIG. 8 is a flowchart of an exemplary process of a memory controller applying a page management policy to memory based on whether two or more stream transactions involving the same memory bank in memory are active.

FIG. 8 is a flowchart of another exemplary criterion and process 88C of a memory controller applying a page management policy. In this example, a memory controller applies a page management policy based on whether two or more stream transactions involving the same memory bank in memory are active, and if so, then based on further criterion or criteria. This process may be performed as part of block 88 in FIG. 4A. As illustrated in FIG. 8, after a memory access by the memory controller 28, the memory controller 28 determines if there are two or more pending stream transactions present to the same memory bank (block 150). If not, the memory controller 28 can apply the default page management policy (block 151).

If there are two or more pending stream transactions present to the same memory bank (block 150), the memory controller 28 can determine if only one or more than one of the pending stream transactions are deadlined (block 152). A deadlined stream transaction is a stream transaction where there is a temporal deadline requirement to complete the stream transaction. For example, if a stream transaction consists of 'N' number of sub-transfers of 'X' number of beats, the deadline associated with the stream transaction may be the time to complete each one of the sub-transfers. Alternatively, the deadline associated with the stream transaction may be the time to complete all sub-transfers. Further still, deadlines may be associated with both sub-transfers and the complete transfer. As one example, a deadline for a stream transaction may be provided in terms of clock cycles, such as, for example, if all entities involved in the transfer of the stream transaction have a common clock source where the deadline can be determined in terms of a common time value. As another example, a deadline for a stream transaction may be provided in terms of absolute time that is calculated by entity(ies) involved in the transfer of the stream transaction.

If only one stream transaction among the pending stream transactions is deadlined, the deadlined stream transaction can be given priority by leaving open memory pages for the deadlined stream transaction after accesses to provide reduced memory access times for the deadlined stream transactions. In this regard, if the memory controller 28 is currently processing the deadlined stream transaction (block 154), the memory controller 28 can leave the current memory page 36 open for the stream transaction being processed (block 156) before ending the current memory access request (block 158). If the memory controller 28 is not currently processing the deadlined stream transaction (block 154), the memory controller 28 can apply the default page management policy, if desired, for the current memory access request (block 160).

If, in block 152, more than one pending stream transaction is deadlined, the memory controller 28 determines if one or more than one of the deadlined pending stream transactions are behind their deadlines (block 162). If only one pending stream transaction is deadlined, and if the memory controller 28 is currently processing this deadlined stream transaction (block 164), the memory controller 28 leaves the current memory page 36 open (block 156). If the memory controller 28 is not currently processing the stream transaction behind its deadline (block 164), the memory controller 28 may apply the default page management policy (block 160).

If, however, more than one pending stream transaction is deadlined (block 162), the memory controller 28 determines if the current stream transaction being processed has a higher priority than the other pending stream transactions not currently being processed (block 166). The priority field 118 in the stream identifier block 98 in FIG. 5 may be consulted in this regard for the current stream transaction and the other pending stream transactions. If the current stream transaction being processed has a higher priority than the other pending stream transactions not currently being processed (block 166), the memory controller 28 can leave the current memory page 36 open (block 156); otherwise, the memory controller 28 can apply a default page management policy (block 160).

If there is no priority field 118 provided for the current stream transaction, or if there is a priority field 118 provided and two or more competing deadlined stream transactions have the same priority in the priority field 118, the priority determination could be made in other manners. For example, the priority determination could be determined by an encoded value (e.g., a percentage of completion, clock cycles behind, or time behind) that indicates how far behind or ahead each stream transaction is at a given point in time when the page management policy decision must be made by the memory controller 28. If all competing deadlined stream transactions are behind, the encoded value could indicate how far each stream transaction is behind, which could be used to determine which memory pages are left open in a page management policy.

Note that the page management policy examples herein, including in FIGS. 10-12, may be provided singly or any in combinations together as desired. Also, any or all of the page management policies disclosed herein may be carried out by the memory controller 28 by circuits, which may or may not include a controller 31 that executes software instructions in a computer-readable medium 33, as illustrated in FIG. 1. Other page management policy criteria can be used by the memory controller 28 to apply a page management policy.

The memory controllers, systems, methods, and computer-readable mediums for applying a page management policy (ies) according to embodiments disclosed herein may be provided in or integrated into any processor-based device for controlling access to memory. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 9:
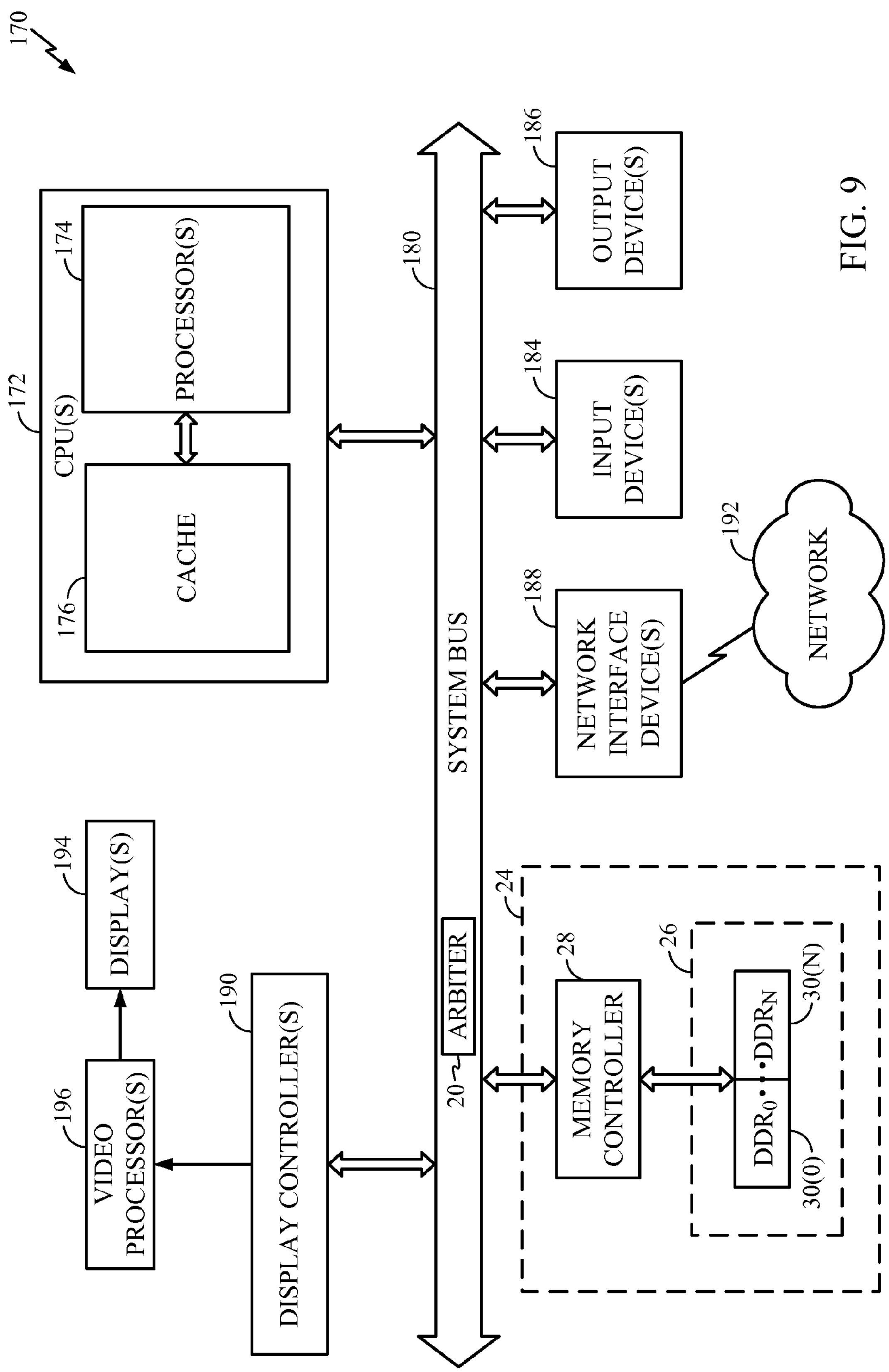
FIG. 9 is a block diagram of an exemplary processor-based system that can include the bus interconnect and memory system of FIG. 1.

In this regard, FIG. 9 illustrates an example of a processor-based system 170 that can employ components of the system 10 illustrated in FIG. 1. In this example, the processor-based system 170 includes one or more central processing units (CPUs) 172 each including one or more processors 174. The CPU(s) 172 may be a master device. The CPU(s) 172 may have cache memory 176 coupled to the processor(s) 174 for rapid access to temporarily stored data. The CPU(s) 172 is coupled to a system bus 180, which intercouples other devices included in the processor-based system 170. The system bus 180 may be a bus interconnect like the bus interconnect 16 of FIG. 1. As is well known, the CPU(s) 172 communicates with these other devices by exchanging address, control, and data information over the system bus 180. For example, the CPU (s) 172 can communicate memory access requests to external memory via communications to the memory controller 28 as a slave device. Although not illustrated in FIG. 9, multiple system buses 180 could be provided, wherein each system bus 180 constitutes a different fabric.

Other master and slave devices can be connected to the system bus 180. As illustrated in FIG. 9, these devices can include the memory system 24, one or more input devices 184, one or more output devices 186, one or more network interface devices 188, and one or more display controllers 190, as examples. The input device(s) 184 can include any type of input device, including but not limited to input keys, switches, voice processors, etc. The output device(s) 186 can include any type of output device, including but not limited to audio, video, other visual indicators, etc. The network interface device(s) 188 can be any devices configured to allow exchange of data to and from a network 192. The network 192 can be any type of network, including but not limited to a wired or wireless network, private or public network, a local area network (LAN), a wide local area network (WLAN), and the Internet. The network interface device(s) 188 can be configured to support any type of communication protocol desired. The memory system 24 can include a memory controller 28 coupled to a memory 26. The memory 26 may include one or more memory units 30(0)-30(N) like provided in the memory system 10 of FIG. 1. The arbiter 20 may be provided between the system bus 180 and memory units 30(0)-30(N) like provided in the memory system 24 of FIG. 1 to control access to the memory units 30(0)-30(N).

The CPU 172 may also be configured to access the display controller(s) 190 over the system bus 180 to control information sent to one or more displays 194. The display controller (s) 190 sends information to the display(s) 194 to be displayed via one or more video processors 196, which process the information to be displayed into a format suitable for the display(s) 194. The display(s) 194 can include any type of display, including but not limited to a cathode ray tube (CRT), a liquid crystal display (LCD), a plasma display, etc.

The CPU(s) 172 and the display controller(s) 190 may act as master devices to make memory access requests to the arbiter 20 over the system bus 180. Different threads within the CPU(s) 172 and the display controller(s) 190 may make requests to the arbiter 20. The CPU(s) 172 and the display controller(s) 190 may provide the master identifier 92 to the arbiter 20 as previously described to determine request a memory access to the memory system 24.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The memory controllers, arbiter, master devices, and sub-master devices described herein may be employed in any circuit, hardware component, integrated circuit (IC), or IC chip, as examples. The memory may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a DSP, an Application Specific Integrated Circuit (ASIC), a FPGA or other programmable logic device, discrete gate or transistor logic, discrete hardware components, or any combination thereof designed to perform the functions described herein. For example, the bus interconnect may be provided by a field programmable gate array (FPGA), an asynchronous synchronous integrated circuit (ASIC), a controller, micro-controller or microprocessor that may execute software instructions, or any combinations thereof. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A memory controller, comprising:

a controller configured to receive a memory access request for a stream transaction and perform a memory access to at least one memory page in memory included in the stream transaction, wherein the stream transaction comprises a superset of burst access types facilitating efficient bulk transfers of data;

wherein the controller is configured to apply a page management policy to the at least one memory page based on information related to the stream transaction.

2. The memory controller of claim 1, wherein the information related to the stream transaction is information selected from the group consisting of a master identifier, a stream identifier, a priority associated with the stream transaction, and a deadline associated with the stream transaction.

3. The memory controller of claim 1, wherein the page management policy is based on whether a current memory page for the stream transaction is a next memory page to the current memory page in the memory to be accessed by a pending stream transaction.

4. The memory controller of claim 3, wherein the page management policy is leave open memory page if a pending memory access request for the pending stream transaction is behind a deadline.

5. The memory controller of claim 4, wherein the pending memory access request for the stream transaction is selected from the group consisting of the memory access request for the stream transaction, and another memory access request for another stream transaction.

6. The memory controller of claim 1, wherein the page management policy is based on whether a next memory page for the memory access request is not a current memory page for the memory access request.

7. The memory controller of claim 1, wherein the page management policy is based on whether there are a plurality of memory access requests for a plurality of stream transactions to a same memory bank in the memory.

8. The memory controller of claim 7, wherein the page management policy is based on whether at least one of the plurality of the memory access requests for stream transactions is deadlined, and at least one of the plurality of the memory access requests for stream transactions is not deadlined.

9. The memory controller of claim 8, wherein the page management policy is close memory page for the at least one of the plurality of the memory access requests for stream transactions that is not deadlined.

10. The memory controller of claim 8, wherein the page management policy is leave open memory page for the at least one of the plurality of the memory access requests for stream transactions that is deadlined.

11. The memory controller of claim 7, wherein the page management policy is based on whether two or more of the plurality of memory access requests for stream transactions are deadlined.

12. The memory controller of claim 11, wherein the page management policy is leave open memory page for the memory access request for the stream transaction among the plurality of the memory access requests for stream transactions not making its deadline.

13. The memory controller of claim 11, wherein the page management policy is further based on priorities of the two or more of the plurality of memory access requests for stream transactions not making their deadlines.

14. The memory controller of claim 11, wherein the page management policy is further based on master identifiers of the two or more of the plurality of memory access requests for stream transactions not making their deadlines.

15. The memory controller of claim 11, wherein the page management policy is further based on at least one of the two or more of the plurality of memory access requests for stream transactions does not have a priority.

16. The memory controller of claim 1 integrated into a semiconductor die.

17. The memory controller of claim 1, further comprising a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player, into which the memory controller is integrated.

18. A method for accessing memory, comprising:

receiving a memory access request for a stream transaction at a memory controller, wherein the stream transaction comprises a superset of bursts providing for larger amounts of data to be transferred as part of a single transaction request;

performing a memory access to at least one memory page in memory referenced by the stream transaction;

determining a page management policy for the at least one memory page based on information related to the stream transaction; and applying the page management policy to the at least one memory page.

19. The method of claim 18, wherein determining the page management policy for the at least one memory page is based on whether a current memory page for the stream transaction is a next memory page to the current memory page in the memory to be accessed by a pending stream transaction.

20. The method of claim 18, wherein the page management policy is leave open memory page if a pending memory access request for a stream transaction is behind a deadline.

21. The method of claim 18, wherein determining the page management policy for the at least one memory page is based on whether a next memory page for the memory access request is not a current memory page for the memory access request.

22. The method of claim 18, wherein determining the page management policy for the at least one memory page is based on whether there are a plurality of memory access requests for stream transactions to a same memory bank in the memory.

23. The memory controller of claim 22, wherein determining the page management policy for the at least one memory page is based on whether at least one of the plurality of the memory access requests for stream transactions is deadlined, and at least one of the plurality of the memory access requests for stream transactions is not deadlined.

24. The method of claim 23, wherein the page management policy is close memory page for the at least one of the plurality of the memory access requests for stream transactions that is not deadlined.

25. The method of claim 23, wherein the page management policy is leave open memory page for the at least one of the plurality of the memory access requests for stream transactions that is deadlined.

26. The method of claim 22, wherein determining the page management policy for the at least one memory page is based on whether two or more of the plurality of memory access requests for stream transactions are deadlined.

27. The method of claim 22, wherein determining the page management policy for the at least one memory page is based on where at least one of the two or more of the plurality of memory access requests for stream transactions does not have a priority.

28. A non-transitory computer-readable medium having stored thereon computer executable instructions to cause a memory controller to receive a memory access request for a stream transaction wherein the stream transaction comprises a superset of bursts providing for larger amounts of data to be transferred as part of a single transaction request and perform a memory access to at least one memory page in memory included in the stream transaction, and apply a page management policy to the at least one memory page based on information related to the stream transaction.

29. The computer-readable medium of claim 28, further comprising computer executable instructions to cause the memory controller to apply the page management policy based on whether a current memory page for the stream transaction is a next memory page to the current memory page in the memory to be accessed by a pending stream transaction.

30. The computer-readable medium of claim 28, further comprising computer executable instructions to cause the memory controller to apply the page management policy based on whether a next memory page for the memory access request is not a current memory page for the memory access request.

31. The computer-readable medium of claim 28, further comprising computer executable instructions to cause the memory controller to apply the page management policy based on whether there are a plurality of memory access requests for stream transactions to a same memory bank in the memory.

* * * * *